United States Patent [19]
Matsuo

[11] Patent Number: 6,138,134
[45] Date of Patent: Oct. 24, 2000

[54] COMPUTATIONAL METHOD AND APPARATUS FOR FINITE FIELD MULTIPLICATION

[75] Inventor: Kazuto Matsuo, Samukawa-machi, Japan

[73] Assignee: Toyo Communication Equipment Co., Ltd., Kanagawa, Japan

[21] Appl. No.: 09/157,635

[22] Filed: Sep. 21, 1998

[30] Foreign Application Priority Data

Sep. 22, 1997 [JP] Japan .................................. 9-275321

[51] Int. Cl.[7] .................................................. G06F 7/00
[52] U.S. Cl. ............................................................ 708/492
[58] Field of Search ........................... 708/491, 492, 708/620, 625; 380/28

[56] References Cited

U.S. PATENT DOCUMENTS

| | | | |
|---|---|---|---|
| 4,368,533 | 1/1983 | Kojima ..................................... | 714/755 |
| 4,567,568 | 1/1986 | Inagawa et al. ........................ | 708/650 |
| 5,206,824 | 4/1993 | Arazi ....................................... | 708/492 |
| 5,987,056 | 11/1999 | Banister ................................ | 375/200 |

*Primary Examiner*—Ohuong Dinh Ngo
*Attorney, Agent, or Firm*—Koda & Androlia

[57] ABSTRACT

A method and a circuit for multiplication on a finite field which operate fast and involve a small circuit scale. There is provided a multiplication circuit on a finite field for multiplication of two arbitrary elements $a=(a_0, a_1, \ldots, a_{m-1})$ and $b=(b_0, b_1, \ldots, b_{m-1})$ of a Galois field $GF(2^m)$ utilizing a polynomial $f=x^m+x^{m-1}+\ldots+x+1$ as a polynomial to derive the $GF(2^m)$ where said f has an irreducible increased number of order, the multiplication circuit comprising a first shift register having m stages whose initial value is one of the elements of the Galois field, m AND gates to which the other element of the Galois field and an output signal from the last m-th stage of the first shift register are input, a second shift register having m+1 stages having an exclusive OR gate at the input of each of the first through m-th stages thereof, and second m exclusive OR gates to which an output signal from the last (m+1)-th stage of the second shift register and an output signal from the first through m-th stages are applied.

3 Claims, 3 Drawing Sheets

COMPUTATIONAL METHOD AND APPARATUS FOR FINITE FIELD MULTIPLICATION

BACKGROUND OF THE INVENTION

1. Field of the Invention

The present invention relates to a computational method and apparatus for finite field multiplication used for an encoder and a decoder for error correction codes and the like.

2. Description of Related Art

Recent technological advances have resulted in transition from analog to digital communication. For digital communication, redundancy of signal is small because binary information represented by 0 and 1 is transmitted, and it is therefore difficult to recover data if any digital error occurs during the transmission. Under such circumstances, error correction codes have been put in use to detect and correct digital error at an receiving end. Cyclic codes are widely used as error correction codes, and a method has been proposed wherein multiplication on a Galois field is used to generate such codes.

A finite field $GF(2^m)$ is a set of $2^m$ elements and each element is represented using exponential representation or vector representation. An element of the order $2^m-1$ in the finite field $GF(2^m)$ is referred to as an "primitive element". According to the exponential representation, each element is represented by an exponential i of $\alpha$ utilizing the fact that an arbitrary element "a" satisfies $a=\alpha^i$ where $\alpha$ represents an primitive element and i represents a positive integer. According to the vector representation, $GF(2^m)$ is regarded as an m dimensional vector space of $GF(2)$, and an arbitrary element "a" is represented by an m dimensional vector $(a_0, a_1, \ldots, a_{m-1})$.

Each component ai of the vector is an element of $GF(2)$, i.e., 0 or 1. In vector representation, a vector space is not limited to one type of basis, and representation of an element can vary depending on the basis used. The basis may be a normal basis and a polynomial basis. The normal basis is a basis as shown below.

$$(\alpha, \alpha^2, \alpha^{2^2}, \ldots, \alpha^{2^{m-1}})$$

where the followings are linearly independent for the primitive element $\alpha$.

$$\alpha, \alpha^2, \alpha^{2^2}, \ldots, \alpha^{2^{m-1}}$$

The polynomial basis a basis $(1, z, z^2, \ldots, Z^{m-1})$ which is generated from a monic irreducible polynomial of degree m over $GF(2)$ using an element z which is a root of f. Here, $a=(a_0, a_1, \ldots, a_{m-1})$ is regarded as an element of $GF(2)[x]$ where x is a variable, and "a" is represented by $a=a_{m-1}x^{m-1}+ \ldots +a_1x+a_0$. This representation is referred to as polynomial representation.

Addition of two elements "a" and "b" over $GF(2^m)$ is represented by $a+b=(a_0+b_0, a_1+b_1, \ldots, a_{m-1}+b_{m-1})$. That is, the two elements may be added over $GF(2)$ for each component. The addition over $GF(2)$ is carried out as Exclusive OR. In the case of exponential representation, however, it is difficult to define the method of addition uniquely. Therefore, vector representation is commonly used for representation of an element.

Conventional methods for the multiplication of two elements "a" and "b" over $GF(2^m)$ includes methods employing exponential representation, a normal base and a polynomial base. A method employing exponential representation, an index k of $ab=\alpha^k$ is computated where "a" and "b" are regarded as $a=\alpha^i$, $b=\alpha^j$. The multiplication of two elements "a" and "b" may be represents as follows.

$$c=ab=\alpha^{i+j}=\alpha^{i+j}(\mod 2m-1)$$

Then a calculation of a reminder on an integral ring employs to obtain the index. The method employing a normal base is described in U.S. Pat. No. 4,587,627 "computational Method and Apparatus for Finite Field Arithmetic" and U.S. Pat. No. 4,745,568 "Computational Method and Apparatus for Finite Field Multiplication" and, particularly, multiplication using a normal base is described in detail in A. J. Menezes, Ed, "Applications of Finite Fields", Kluwer Academic Pub.

The method employing a polynomial base is a method wherein a multiplicand $a=(a_0, a_1, \ldots, a_{m-1})$ and a multiplier $b=(b_0, b_1, \ldots, b_{m-1})$ are respectively regarded as polynomials $a=a_{m-1}x_{m-1}+ \ldots +a_1x+a_0$ and $b=b_{m-1}x_{m-1}+ \ldots +b_1x+b_0$ over $GF(2)$; "a" and "b" in the polynomial representation are subjected to polynomial multiplication over $GF(2)$ to derive $d=d_{2m-2}x^{2m-3}+ \ldots +d_1x+d_0$ which is then divided by a polynomial $f=x^m+f_{m-1}x^{m-1}+ \ldots +f_1x+f_0$; and $c=(c_0, c_1, \ldots, c_{m-1})$ derived from the remainder $c=c_{m-1}x^{m-1}+ \ldots +c_1x+c_0$ is used as the result of c=ab.

The conventional methods and circuits for multiplying two elements "a" and "b" over a finite field GF(2m) as described above have had the following problems.

The method employing exponential representation involves conversion of an element from vector representation to exponential representation. This method requires a conversion table which dimension has an exponential size. Therefore, a circuit employing the exponential representation method will be quite large in scale.

Any method employing a normal base requires $m^2$ or more gates to be implemented in a circuit, which results in a problem in that the circuit is in a very large scale when m is large.

Further, the method employing a polynomial base involves division of a polynomial of degree 2m-1 and polynomial degree m over $GF(2)$. This division involves an enormous amount of computing time and further results in a problem in that the scale of a circuit to implement this methods becomes too large.

The present invention has been conceived to solve the problems as described above associated with conventional methods and circuits for multiplication over a finite field, and it is an object of the invention to provide a computational method and apparatus for finite field multiplication in which computation will be carried out at high speed and in a short time and which requires a small circuit scale.

SUMMARY OF THE INVENTION

In order to achieve the above-described problems, according to the first aspect of the computational apparatus for finite field multiplication of the present invention, there is provided a multiplication circuit on a finite field for multiplication of two arbitrary elements $a=(a_0, a_1, \ldots a_{m-1})$ and $b=(b_0, b_1, \ldots, b_{m-1})$ of a Galois field $GF(2^m)$ utilizing a polynomial $f=x^m+x^{m-1}+ \ldots +x+1$ over Galois field $GF(2)$ where m is extended degree so that the polynomial f becomes irreducible over $GF(2)$, and the multiplication circuit comprises:

a first shift register having m stages whose initial value is one of the elements of the Galois field;

m AND gates to which the other element of the Galois field and an output signal from the last m-th stage of the first shift register are input;

a second shift register having m+1 stages having an exclusive OR gate at the input of each of the first through m-th stages thereof; and second m exclusive OR gates to which an output signal from the last (m+1)-th stage of the second shift register and an output signal from the first through m-th stages are input, wherein output signals of the AND gates are input to the respective first exclusive OR gates, and an output signal from the last stage of the second shift register is fed back to one of the first exclusive OR gates provided at the input of the first stage of the second shift register; and the first shift register is initialized to the value of the first element of the Galois field and the second shift register is initialized to 0 and, thereafter, the first and second registers are simultaneously shifted m+1 times to obtain the result of multiplication of the two elements "a" and "b" of the Galois field from the output of the second exclusive OR gates.

According to the second aspect of the computational apparatus for finite field multiplication of the present invention, there is provided a multiplication circuit on the finite field according to the first aspect as described above wherein an output signal of the last (m+1) stage of the second shift register and an output signal from the first exclusive OR gates are input to the second exclusive OR gates and wherein the first and second registers are simultaneously shifted m times to obtain the result of multiplication of the two elements "a" and "b" of the Galois field from the output of the second exclusive OR gates.

According to the third aspect of the invention of computational method for finite field multiplication, there is provided a multiplication circuit on a finite field for multiplication of two arbitrary elements $a=(a_0, a_1, \ldots a_{m-1})$ of and $b=(b_0, b_1, \ldots, b_{m-1})$ of a Galois field $GF(2^m)$ utilizing a polynomial $f=x^m+x^{m-1}+\ldots+x+1$ over Galois field GF(2) where m is extended degree so that the polynomial f becomes irreducible, the multiplication method includes the following steps comprising:

the method employing first m bits storage means ra for storing one of the elements "a" of the Galois field, second m bits storage means rb for the other element "b" of the Galois field and third m+1 bits storage means rc for storing the result c of the multiplication and comprising the steps of:

initializing the third storage means rc to a value 0;

shifting the second storage means rb and third storage means rc;

detecting any overflow of the second storage means rb at each shift;

if there is any overflow of the second storage means rb, performing exclusive OR on a value $rc_i$ in the third storage means rc and a value $ra_i$ in the first storage means rb where i=0~m−1 bits;

substituting the result for $rc_i$;

repeating shift m times; and performing exclusive OR on the value rci of i=0~m−1 bits in the third storage means rc and a value rcm in the m-th bit.

DETAILED DESCRIPTION OF PREFERRED EMBODIMENTS

Figure 1:
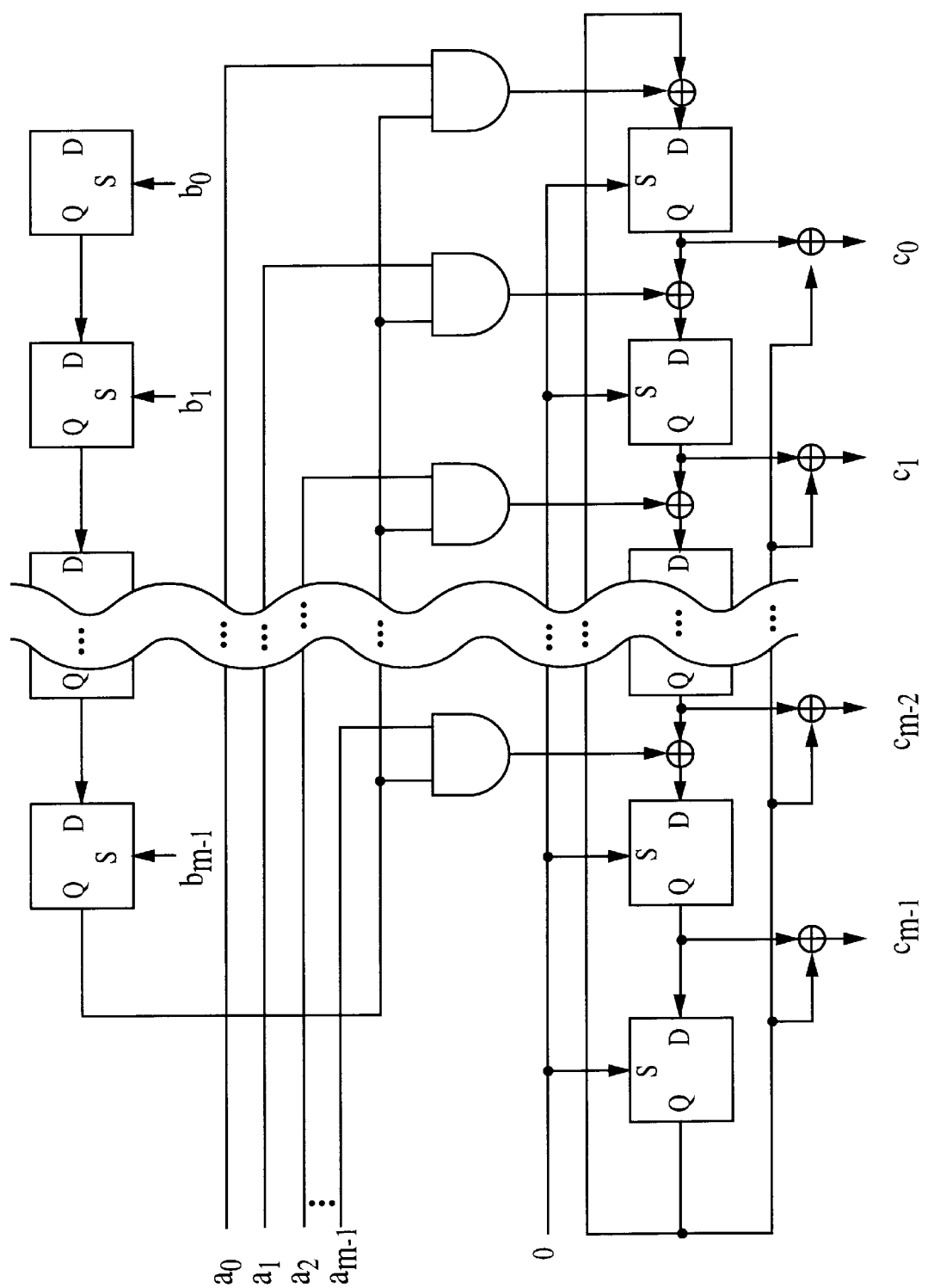
FIG. 1 is a configuration diagram showing a general circuit for multiplication on a finite field according to the present invention.

The present invention will now be described in detail based on an principle of a method for multiplication on a finite field and the illustrated embodiment.

Let us assume that a polynomial $f=x^m+f_{m-1}x^{m-1}+\ldots+f_1x+f_0$ is used to derive $GF(2^m)$ and that vector representation using a polynomial base having a multiplicand "a" and a multiplier "b" and corresponding polynomial representation on GF(2) are given as described above. Then, "a" and "b" are multiplied as follows.

$$ab=(a_{m-1}x^{m-1}+\ldots+a_1x+a_0)(b_{m-1}x^{m-1}+\ldots+b_1x+b_0) \ (\text{mod } f)$$

where (mod f) indicates that a remainder is obtained from division with f. The above equation can be changed as follows.

$$ab=a(b_{m-1}x^{m-1}+\ldots+b_1x+b_0)(\text{mod } f)$$

$$=((\ldots((b_{m-1}ax+b_{m-1}a)x+b_{m-2}a)x+\ldots)x+b_1a)x+b_0a(\text{mod } f)$$

$$=((((\ldots((b_{m-1}ax(\text{mod } f))+b_{m-1}a)x(\text{mod } f))+\ldots)x(\text{mod } f))+b_1a)x(\text{mod } f))+b_0a$$

$d=d_{m-1}x^{m-1}+\ldots+d_1x+d_0$ is derived from the above equation, which indicates that the multiplication between "a" and "b" is achieved by repetition of (dx (mod $f$))+$b_i$a. Here, $b_ia=(b_ia_0, b_ia_1, \ldots b_ia_{m-1})$, and multiplication biaj of the elements of each GF(2) is achieved by ANDing $b_i$ and $a_j$.

$$dx=d_{m-1}x^m+d_{m-2}x^{m-1}+\ldots+d_1x^2+d_0x$$

The nature of the remainder obtained by division with f gives:

$$x^m=f_{m-1}x^{m-1}+\ldots+f_1x+f_0$$

As a result, there is derived:

$$dx=(f_{m-1}d_{m-1}+d_{m-2})x^{m-1}+\ldots+(f_2d_{m-1}+d_1)x^2+(f_1d_{m-1}+d_0)x+f_0d_{m-1}$$

The multiplication over $GF(2^m)$ may be carried out by performing the above-described procedure using a polynomial of degree n=m+1 (g=hf) instead of f and dividing the result by f to obtain a remainder.

Here, =(x+1)$f$ where $f=x^m+x^{m-1}+\ldots x+1$, and $g=x^n+$. Then, the above-described $d=d_{n-1}x^{n-1}\ldots+d_1x+d_0$ is changed as follows because $$dx=d_{n-1}x^n+d_{n-2}x^{n-1}+\ldots+d_1x^2+d_0x, \text{ and } x^n=1.$$

$$dx=d_{n-2}x^{n-1}+\ldots+d_1x^2+d_0x+d_{n-1}$$

Let us assume that the result of the above-described procedure is expressed as follows using the above equation.

$$S = S_m x^m + \ldots + S_1 x + S_0$$

Then, since the remainder of s divided by f is ab which is derived as follows.

$$ab = (S_m + S_{m-1})x^{m-1} + \ldots + (S_m + S_1)x + S_m + S_0$$

In summary, the method for multiplication on a finite field according to the invention may be processed according to a procedure wherein:

Input: $a=(a_0, a_1, \ldots a_{m-1})$, $b=(b_0, b_1, \ldots, b_{m-1})$, $cf=(f_0, f_1, \ldots, f_{m-1})$;

Output: $ab=c=(c_0, c_1, \ldots, c_{m-1})$;

step 1.: a→ra, b→rb, rc=0, i=0;

step 2.: If i>m−1 then goto step 6.;

step 3.: rb<<1, rc<<1;

step 4.: If cb=1 then rc=rc⊕ra;

step 5.: i=i+1 and goto step 2.;

step 6.: Output $c=(rc_0 \oplus rc_m, rc_1 \oplus rc_m, \ldots, rc_{m-1} \oplus rc_m)$;

Here, ra and rc are binary values of m+1 bits, and rb is a binary value of m bits. "a→ra" means replacement of data "a" as $ra = a_{m-1}a_{m-2}\ldots a_1 a_0$, and "b→rb" means replacement of data "b" as $rb = b_{m-1}b_{m-2}\ldots b_1 b_0$. "rb<<1" means that rb is shifted to the left by one bit, e.g., "rb<<1" executed on $rb = b_{m-1}b_{m-2}\ldots b_1 b_0$ results in $rb = b_{m-2}b_{m-3}\ldots b_1 b_0 0$ at which time $b_{m-1}$ is applied to a carry flag cb. "rc<<1" means that rc is cyclically shifted to the left by one bit. For example, "rc<<1" carried out on $rc = c_m c_{m-1}\ldots c_1 c_0$ results in $rc = c_{m-1}c_{m-2}\ldots c_1 c_0 c_m$. The symbol "⊕" represents exclusive OR.

Based on the above, a multiplication circuit for GF($2^m$) can be provided as shown in FIG. 1 to be described later, and the same circuit provides a result of multiplication of two elements "a" and "b" over GF($2^m$) as "c" when a clock is input m+1 times.

An example (an example of calculation) based on the above-described principle of the invention will now be described in detail. The description will be made on an assumption that GF is GF($2^4$), i.e., m=4. The generation polynomial f is given by $f = x^4 + x^3 + x^2 + x + 1$. First, the calculation is carried out on a=(1,0,1,1), b=(0,1,0,1) according to the method described above as an example for explaining the method of multiplication.

According to step 1, ra, rb and rc are set at 01101, 1010 and 00000, respectively, and i is set at 0. Step 3 and step 4 are repeated four times. The following shows how this repetition proceeds.

i=0:

step 3.: rb=0100, cb=1, rc=00000.

step 4.: rc=01101.

i=1:

step 3.: rb=1000, cb=0, rc=11010.

step 5.: rc=11010.

i=2:

step 3.: rb=0000, cb=1, rc=10101.

step 4.: rc=11000.

i=3:

step 3.: rb=0000, cb=0, rc=10001.

step 4.: rc=10001.

Further, the result "c" of the multiplication of "a" and "b" is calculated as follows at step 6.

c=(1⊕1, 0⊕1, 0⊕1, 0⊕1)=(0, 1, 1, 1)

Another example of calculation will now be described wherein a=(0,1,0,1) and b=(1,1,0,1) are multiplied. The same procedure as described above a result of multiplication as follows.

step 1.: ra=01010, rb=1011, rc=00000, i=0.

i=0:

step 3.: rb=0110, cb=1, rc=00000.

step 4.: rc=01010.

i=1:

step 3.: rb=1100, cb=0, rc=10100.

step 4.: rc=10100.

i=2:

step 3.: rb=1000, cb=1, rc=01001.

step 4.: rc=00011.

i=3:

step 3.: rb=0000, cb=1, rc=00110.

step 4.: rc=01100.

step 6.: c=(0,0,1,1)

Figure 2:
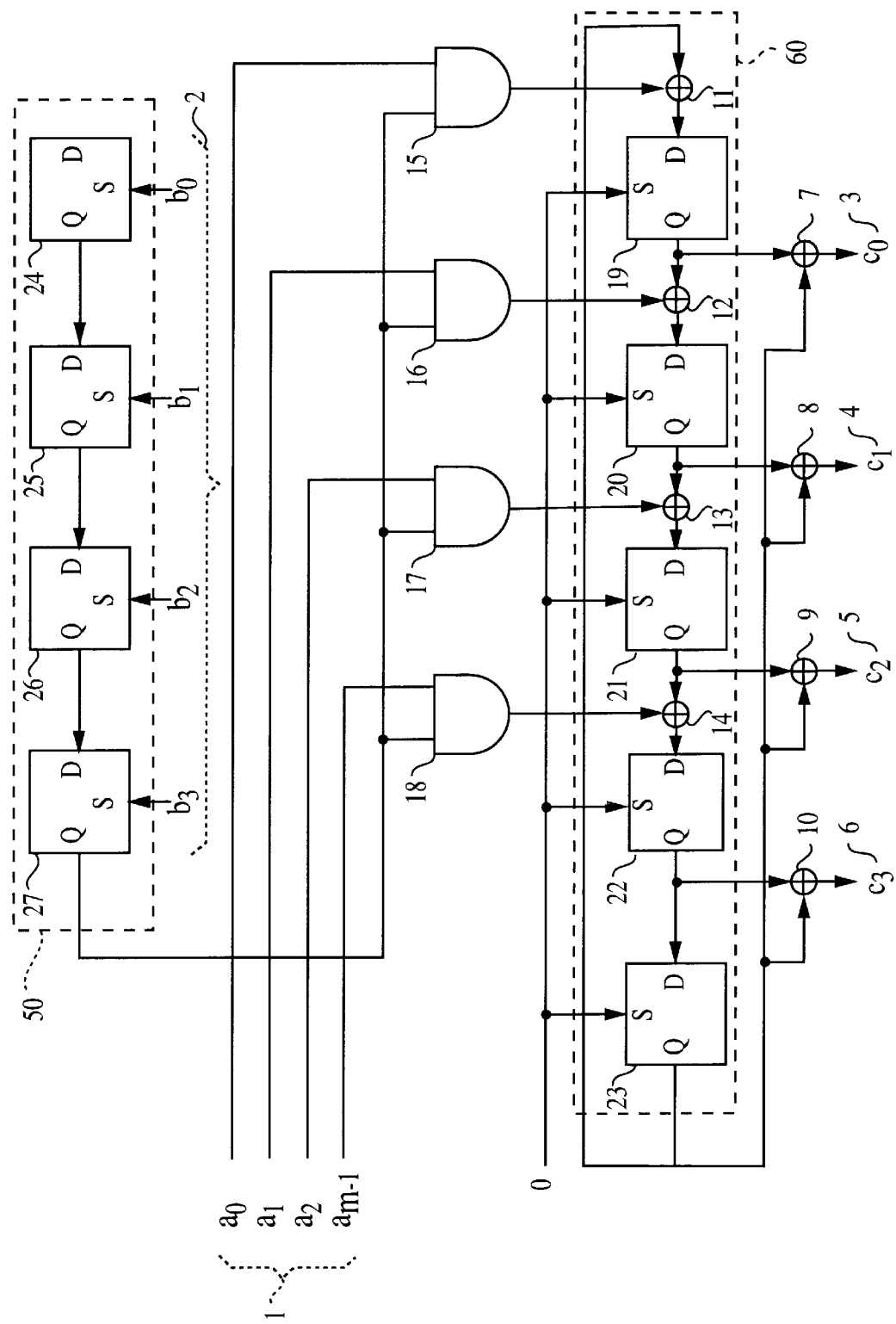
FIG. 2 is a circuit configuration diagram showing a circuit for multiplication on a finite field according to the present invention.

A description will now be made on a multiplication circuit for implementing the method for multiplication described above. FIG. 1 is a diagram showing a circuit configuration of a common multiplication circuit for implementing the method for multiplication over a finite field using GF($2^m$) according to the present invention. FIG. 2 is a circuit configuration diagram showing an embodiment of a common multiplication circuit for implementing the method for multiplication on a finite field using GF($2^m$) according to the present invention, which is a multiplication circuit that calculates c=ab where m=4 in FIG. 1. The circuit for multiplication on a finite field shown in FIG. 2 derives results 3 through 6 of operation $c=(c_0,c_1,c_2,c_3)$ from a multiplicand 1, i.e., $a=(a_0,a_1,a_2,a_3)$ and a multiplier 2, i.e., $b=(b_0,b_1,b_2,b_3)$. It comprises a first four-stage shift register 50 formed by four 1-bit storage cells 24 through 27, AND gates 15 through 18 to which an output signal from a last stage 27 of the first shift register 50 and signals from the multiplicand 1, i.e., $a=(a_0,a_1,a_2,a_3)$ are applied, a second five-stage shift register 60 formed by five 1-bit storage cells 19 through 23 having first exclusive OR gates 11 through 14 at the input of the first through fourth stages 19 through 22, respectively, and second exclusive OR gates 7 through 10 to which an output signal from the last stage 23 of the second shift register and output signals from the first through fourth stages 19 through 22 are applied. Output signals from the AND gates 15 through 18 are applied to the first exclusive OR gates 11 through 14, respectively. The output signal from the last stage 23 of the second shift register is connected to the gate 11 among the first exclusive OR gates provided at the input of the first stage 19 to provide feedback. The results of multiplication between the "a" and "b" are obtained from the output of the second exclusive OR gates 7 through 10.

In the one-bit storage cells 4a through 4d and 6a through 6g forming the stages of the first and second shift registers, D represents an input terminal; Q represents an output terminal; S represents a preset input terminal. Those 1-bit storage cells operates in synchronism on a clock signal t which is not shown.

Figure 3:
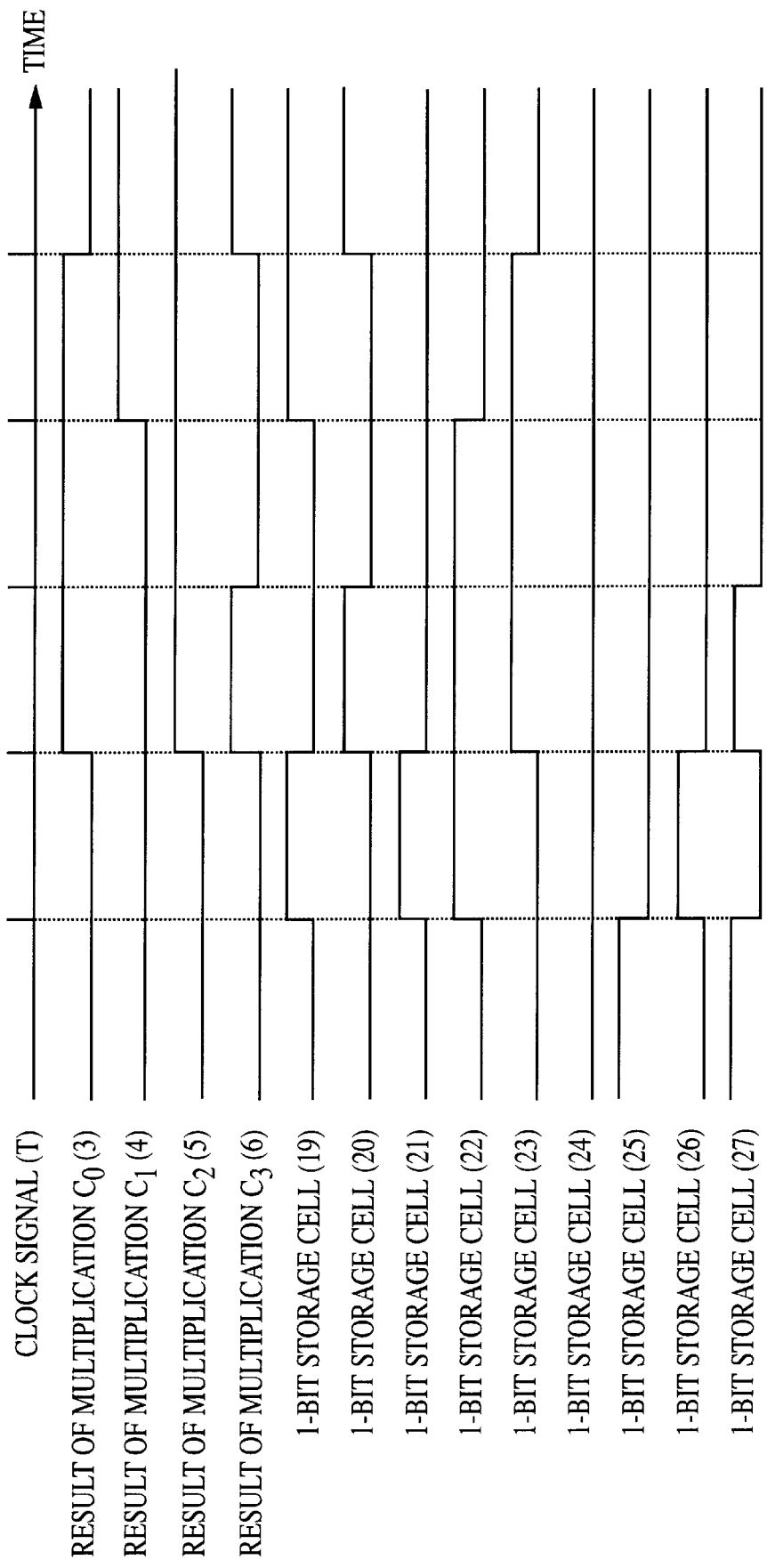
FIG. 3 is a time chart for explaining the operation of a circuit for multiplication on a finite field according to the present invention.

FIG. 3 is a time chart for explaining the operation of the above-described multiplication circuit. The multiplication circuit of the present invention shown in FIG. 2 will be described with reference to FIG. 3. When a=(1,0,1,1) and b=(0,1,0,1) as in the example of calculation described above, the shift registers 50 and 60 correspond to rb and rc in the described example of calculation, respectively. First, the 1-bit storage cells 19 through 23 forming the second shift register 60 is initialized to 0, and the 1-bit storage cells 24, 25, 26 and 27 forming the first shift register 50 are initialized to $b_0$, $b_1$, $b_2$ and $b_3$, respectively. Thereafter, a clock signal is input one to the 1-bit storage cells 19 through 27, which results in a shift of the shift registers 50 and 60. This corresponds to the operation at step 3 in the above-described example of calculation. Then, the AND gates 15 through 18 carry out the conditional branching at the step 4 of the example of calculation, and the first exclusive OR gates 11 through 14 perform the calculation at step 4. Further, the second exclusive OR gates 7 through 10 carry out the calculation at the step 6.

Therefore, when the clock signal is applied m+1 times to the shift registers 50 and 60, i.e., when the clock signal is applied to the 1-bit storage cells 19 through 23 five times, elements of the result of multiplication $c=(c_0,c_1,c_2,c_3)$ between "a" and "b" is produced at the outputs 3 through 6 of the second exclusive OR gates 7 through 10. As described above, the multiplication circuit shown in FIG. 2 is a logic circuit which implements the above-described method for multiplication to perform the multiplication of $GF(2^4)$ correctly.

Since a circuit for multiplication on a Galois field according to the present invention operates as described above, it is only required to prepare shift registers having m+1 stages at the maximum. This eliminates the need for a conversion table for exponential representation and $m^2$ logic elements involved in the prior art to allow a smaller circuit. In addition, since the need for division operation is eliminated unlike the prior art, the time for calculation can be reduced to allow fast processing.

The above-described embodiment has a configuration wherein results of multiplication are obtained by inputting output signals from the 1-bit storage cells forming the second shift register 60 to the second exclusive OR gates 7 through 10 and by inputting a clock signal to the first and second shift registers m+1 times. However, the present invention is not limited to this embodiment and, for example, a configuration is possible wherein the results of multiplication are obtained by inputting output signals from the first exclusive OR gates 11 through 14 instead of the output signals of the 1-bit storage cells 19 through 22 to the second exclusive OR gates 7 through 10 and by inputting a clock signal to the first and second shift registers m times.

Although the present invention has been described with reference to an application of the same to an increased number of order m=4, the present invention is not limited thereto and may be applied to any increased number m for which f is irreducible.

Since a Galois field $GF(2^m)$ is formed as a generation polynomial as described above, the present invention is significantly advantageous in providing a method and a circuit for multiplication on a finite field wherein high speed processing is performed and the circuit scale is small.

What is claimed is:

1. A multiplication circuit on a finite field for multiplication of two arbitrary elements $a=(a_0, a_1, \ldots, a_{m-1})$ and $b=(b_0, b_1, \ldots, b_{m-1})$ of a Galois field $GF(2^m)$ utilizing a polynomial $f=x^m+x^{m-1}+ \ldots +x+1$ over a Galois field $GF(2^m)$ as a polynomial to derive said $GF(2^m)$ where said f has an irreducible increased number of order, said multiplication circuit comprising:

a first shift register having m stages whose initial value is one of the elements of said Galois field;

m AND gates to which the other element of said Galois field and an output signal from the last m-th stage of said first shift register are input;

a second shift register having m+1 stages having an exclusive OR gate at the input of each of said first through m-th stages thereof; and second m exclusive OR gates to which an output signal from the last (m+1)-th stage of said second shift register and an output signal from the first through m-th stages are input, wherein output signals of said AND gates are input to the respective first exclusive OR gates, and an output signal from the last stage of said second shift register is fed back to one of said first exclusive OR gates provided at the input of the first stage of said second shift register; and said first shift register is initialized to the value of the first element of said Galois field and said second shift register is initialized to 0 and, thereafter, said first and second registers are simultaneously shifted m+1 times to obtain the result of multiplication of the two elements "a" and "b" of said Galois field from the output of said second exclusive OR gates.

2. The multiplication circuit according to claim 1, wherein an output signal of the last (m+1)-th stage of said second shift register and an output signal from said first exclusive OR gates are input to said second exclusive OR gates and wherein said first and second registers are simultaneously shifted m times to obtain the result of multiplication of the two elements "a" and "b" of said Galois field from the output of said second exclusive OR gates.

3. A method for multiplication on a finite field for multiplying two arbitrary elements $a=(a_0, a_1, \ldots, a_{m-1})$ and $b=(b_0, b_1, \ldots, b_{m-1})$ of a Galois field $GF(2^m)$ to obtain a result $c=(c_0, c_1, \ldots c_m)$ utilizing a polynomial $f=x^m+x^{m-1}+ \ldots +x+1$ as a polynomial to derive said $GF(2^m)$ where said f has an irreducible increased number of order, said method employing first m bits storage means ra for storing one of the elements "a" of said Galois field, second m bits storage means rb for the other element "b" of said Galois field and third m+1 bits storage means rc for storing the result c of the multiplication and comprising the steps of:

initializing said third storage means rc to a value 0;

shifting said second storage means rb and third storage means rc;

detecting any overflow of said second storage means rb at each shift;

if there is any overflow of said second storage means rb, performing exclusive OR on a value $rc_i$ in said third storage means rc and a value $ra_i$ in said first storage means rb where i=0~m−1 bits;

substituting the result for $rc_i$;

repeating shift m times; and performing exclusive OR on a value $rc_i$ of i=0~m−1 bits in said third storage means rc and a value $rc_m$ in the m-th bit.

* * * * *